United States Patent [19]

Nelson

[11] 4,415,367
[45] Nov. 15, 1983

[54] PUMPABLE THIXOTROPIC CEMENT SLURRIES FOR USE IN CEMENTING PIPES IN A WELL

[75] Inventor: Erik B. Nelson, Tulsa, Okla.

[73] Assignee: The Dow Chemical Company, Midland, Mich.

[21] Appl. No.: 943,583

[22] Filed: Sep. 18, 1978

[51] Int. Cl.³ ............................................... C04B 7/35
[52] U.S. Cl. ........................................ 106/89; 106/118; 106/314; 166/292; 166/293
[58] Field of Search ................... 106/90, 97, 104, 118, 106/314, 315; 166/292, 293

[56] References Cited

U.S. PATENT DOCUMENTS

| | | | |
|---|---|---|---|
| 931,884 | 8/1909 | McCormick | 106/89 |
| 1,370,646 | 3/1921 | Hayward et al. | 423/DIG. 2 |
| 1,843,779 | 2/1932 | McWhorter | 423/117 |
| 2,184,271 | 12/1939 | Colton | 106/109 |
| 2,806,531 | 9/1957 | Morgan et al. | 166/293 |
| 3,425,892 | 2/1969 | Edelson et al. | 106/315 |
| 3,891,454 | 6/1975 | Cunningham et al. | 106/97 |

FOREIGN PATENT DOCUMENTS 50-29641 3/1975 Japan ...................... 106/97

*Primary Examiner*—James Poer
*Attorney, Agent, or Firm*—J. B. Guffey

[57] ABSTRACT

Cement slurries comprising (a) iron (II) sulfate, or hydrate thereof, (b) aluminum sulfate, or a hydrate thereof, (c) a hydraulic cement comprising calcium hydroxide or a hydrolyzable calcium oxide (e.g., a Portland cement), and (d) water, are described. These cement slurries are pumpable and thixotropic and have particular utility in cementing pipe into the borehole of a petroleum well.

10 Claims, No Drawings

PUMPABLE THIXOTROPIC CEMENT SLURRIES FOR USE IN CEMENTING PIPES IN A WELL

BACKGROUND OF THE INVENTION

1. Field of the Invention

This invention pertains to novel cement slurries which are pumpable and thixotropic. This invention also pertains to the use of such novel cement slurries in cementing pipe into a borehole of a petroleum well or other well that traverses subterranean formations. This invention also pertains to a method of sealing "thief zones" in subterranean formations.

2. Description of the Prior Art

The technology for drilling deep wells through one or more subterranean formations for the purpose of removing fluids (liquids and/or gases), particularly hydrocarbons, is well known. Normally, this entails drilling a borehole from the surface to the desired formation and inserting a casing or pipe within the borehole through which various materials may be added to stimulate well production and through which the desired liquids and/or gases are withdrawn. The borehole is of necessity of greater diameter than the casing or pipe and the space between the casing or pipe and the sides of the borehole must be filled. There are a variety of reasons why this must be done, but the most important reasons are to support and secure the pipe within the borehole and to restrict fluid movement between producing formations.

Cement slurries are normally used to fill the void between the casing or pipe and the walls of the borehole; a process called "well cementing" in the industry. In using such cement slurries, a line or string of pipe is inserted into the borehole and the cement slurry is pumped down through the pipe into the bottom of the borehole and then upwardly along the outside of the pipe until the annular space between the pipe and the borehole is filled. The cement slurry must be then cleared from the interior of the pipe before it hardens; this is normally accomplished by injecting a liquid medium behind the cement slurry and using it as a "hydraulic fluid" to force the remaining cement out of the pipe. In another but less common technique, the borehole is filled with a cement slurry and the pipe or casing (normally with the end sealed) is lowered into the hole. Cementing techniques are more fully described by D. K. Smith in "Cementing", Monograph Vol. 4, Henry L. Doherty Series, Society of Petroleum Engineers of AIME, New York (1976).

Cementing operations place very rigorous demands upon the cement slurries used. A special area of technology has been developed to supply cements capable of meeting such demands. The man of ordinary skill in the art relating to the instant invention is, therefore, a person skilled in the manufacture and use of cement slurries in well cementing.

Many patents in this area have been classified by the U.S. Patent and Trademark Office under the classification 166/285, 292 and 293.

Various additives have been developed for use in cement slurries to improve specific properties. For example, compounds have been added to: retard or accelerate the rate of cure (i.e., hydration and hardening of the slurry); prevent fluid loss; improve green strength; etc. The ideal cement slurry, of course, is one which does not change its viscosity at all until the cement is in place and then proceeds to cure very rapidly.

Various inorganic sulfate salts have been used as cement additives which normally cause the cement to expand. S. Chatterji et al., Magazine of Concrete Research, 19 (60) 185–9 (1967); J. Benstead, Cement Technology, volume 2, No. 3, 73–6 and 100 (1971); W. Gutt, et al., Cement Technology, volume 2, No. 5, 143–7 and 150–7 (1971); and Smith, ibid, at page 13. A wide variety of other references have been published which show the effect of sulfate salts on Portland cements in particular. Budnikov, Chemistry of Cement, Proceedings of the Fourth International Symposium, Natural Bureau of Standards, 469–477 (1960) is illustrative and deals with the effect of calcium sulfate hemihydrate (plaster of paris) on Portland cement.

Various inorganic chloride salts, and particularly sodium chloride and calcium chloride, have also been used as cement additives to cause expansion. See, for example, the Journal of Petroleum Technology, 187–194 (February, 1963).

In still other instances, it has been found that certain mixtures of inorganic salts have beneficial effects upon the cements. For example, Slagle (U.S. Pat. No. 3,340,929) discovered that mixtures of chloride salts (specifically sodium chloride) and sulfates (e.g., sodium sulfate) were effective in causing Portland cement to expand.

Aluminum sulfate, hydrated calcium sulfate, iron sulfate and sodium sulfate, individually, are perhaps the more common sulfates which have been added to the cement slurries. Combinations of these particular cements may have been used in the prior art, but to applicant's knowledge no one has previously described or used a combination of iron (II) sulfate and an aluminum sulfate in a cement slurry. This combination of iron (II) and aluminum sulfate salts produces a dramatic synergistic effect as will be hereafter described.

SUMMARY OF THE INVENTION

It has now been discovered that liquid aqueous compositions comprising (a) iron (II) sulfate, or a hydrate thereof, and (b) aluminum sulfate, or a hydrate thereof, are unique compositions. Such aqueous compositions when blended with (c) a hydraulic cement comprising calcium hydroxide and/or a hydrolyzable calcium oxide and (d) water form novel cement slurries that are pumpable and thixotropic. By "thixotropic" is meant that the cement slurries form a gel-like structure within a short period of time after mixing which will thin when subjected to conditions of shear or stress (as for example during pumping) and which will reset to a gel-like structure when the condition of stress or shear is relieved. These novel thixotropic cement slurries are particularly useful in cementing the annular void space between a casing or pipe in a borehole. These cement slurries are easily pumped downwardly through the pipe or casing and then outward and upwardly through the annular void on the outside of the pipe. When the cement has been put into place, the novel cement slurries form a gel-like structure essentially immediately and become self-supporting by exerting pressure along the formation wall. This results in a substantial reduction of hydrostatic pressure of the cement column at the bottom of the well while curing. The reduced hydrostatic head prevents the occurrence of a condition known as "slurry fallback" where the cement column moves down the annulus and leaves a void area near the surface. Further, because of the unique thixotropic properties of the cement slurries, the materials tend to seal off "thief zones" which are commonly formed during the drilling operation or during one of the other operations prior to cementing the well and in preparing the well for production. These thief zones are, for example, areas of the wall of the borehole which have caved in and open up a void into the formation. Such thief zones can not only take up large quantities of cement but also rob the cement of necessary fluids. The novel thixotropic cement slurries enter the opening to such a zone and seal it off by forming a gel structure due to reduced shear at the opening or just past the opening and proceed to harden immediately to a dimensionally stable cement form.

DETAILED DESCRIPTION OF THE INVENTION

The iron (II) and aluminum sulfate salts constitute known classes of compounds. Normally such sulfates are commercially available as hydrated salts. For example, iron (II) sulfate is commercially available as the heptahydrate ($FeSO_4.7H_2O$) and aluminum sulfate is normally available as the octadecyl hydrate ($Al_2(SO_4)_3.18H_2O$). The hydrated salts are quite satisfactory for use herein. Normally, the salts are used in amounts of from about 2.5 moles to about 4 moles of aluminum sulfate per mole of iron (II) sulfate; preferably, from about 3.2 to about 3.8 moles of aluminum sulfate per mole of iron (II) sulfate.

Hydraulic cements are also a known class of compounds, any member of which may be used herein provided that it contains calcium hydroxide or a hydrolyzable calcium oxide. The Portland cements are operable and preferred cements for use herein. Included within the Portland cement classification are those listed as Class A, B, C, G, and H by the American Petroleum Institute (API). Such cements are predominantly calcium oxide and silicon dioxide with minor amounts of iron oxide, aluminum oxide, magnesium oxide, sulfur trioxide, etc. The chemical compounds found in set Portland cements are tricalcium aluminate, tricalcium silicate, dicalcium silicate, and tetracalcium aluminoferrite. Another commercial cement that is likewise operable and preferred in the instant invention is sold under the trade name "Unadeep" by Universal Atlas Cement Div. U.S. Steel, which consists primarily of dicalcium silicate, quartz, and calcium oxide. The important feature in each of these cements is that they contain a hydrolyzable calcium oxide.

The mixture of iron (II) sulfate and aluminum sulfate salts can be blended with the cements in any convenient manner. For example, an aqueous concentrate of the inorganic sulfate salts could be blended with the cement and water to form the cement slurry; a mixture of the solid inorganic salts could be dry blended with the cement and subsequently blended with water to form the cement slurry; one of the solid inorganic sulfate salts could be dry blended with the cement and subsequently blended with an aqueous concentrate of the other inorganic sulfate salt and water; etc. It has been found particularly convenient to form an aqueous concentrate of the iron (II) sulfate and aluminum sulfate in the presence of a stabilizing amount of sulfuric acid. These concentrates are solutions and are preferably saturated or substantially saturated solutions.

The water used in forming the cement slurries may be either fresh water or water having a high mineral content (e.g., sea water). The fact that sea water can be used in the instant invention is particularly advantageous.

Conventional additives may be included in the cement slurries so long as such additives do not deleteriously affect the thixotropy of the cement slurries or render the final properties of the cement unsatisfactory. For example, one may find it advantageous to include retarders in the novel cement slurries to inhibit the rate of cure. The selection of such retarders is, of course, well within the skill of the art and will vary depending upon the particular cementing job at hand.

EXPERIMENTAL

The following experiments will further illustrate the invention:

EXAMPLE 1

A liquid concentrate was prepared by dissolving 32.8 parts by weight of $Al_2(SO_4)_3.18H_2O$, 4.5 parts of ($FeSO_4.7H_2O$ and 3.0 parts of $H_2SO_4$ in 59.7 parts of water. This aqueous concentrate was a pale blue-green solution. A cement slurry was then prepared by diluting 35 ml of the liquid concentrate with 315 ml of water and adding 500 g of an API Class G Portland cement to this aqueous solution using a shear blender. The dry cement was added to the aqueous solution with rapid stirring in this particular step. The cement dispersed easily and formed a uniform aqueous cement slurry in the container. After mixing was complete, the aqueous cement slurry was allowed to remain stationary for a period of from about four to five minutes. The slurry formed a self-supporting gel at the end of this time, as demonstrated by turning the container upside down and observing that the slurry remained in the container. The gelled aqueous cement slurry, however, was easily broken by agitation with a stirring rod or by shaking the container and when broken poured easily from the container. A gel reformed within one minute after agitation of the slurry ceased. The preparation of the cement slurry was done according to API Procedure RP10B. The gel strengths, thickening times, and compressive strengths of the cement slurries under different cure conditions were measured by API test procedures using a Fann V-G Meter ® for the gel strength and test procedure RP10B (Section 7) for thickening time tests and RP10B (Section 6) for determining compressive strengths. The data from these tests are shown below:

| Additional Data | | | | | |
|---|---|---|---|---|---|
| Gel strengths - measured on Fann V-G Meter - (lbs/100 ft²) | | | | | |
| Temperature (°F.) | 10 sec | 60 sec | 3 min | 5 min | 10 min |
| 80 | 23 | 47 | 80 | 85 | 190 |
| 100 | 47 | 70 | 175 | 210 | 300+ |

Thickening times
80° F.: >480 min
100° F.: 450 min
125° F.: 200 min

Compressive strengths - measured in psi using 2" × 2" cubes

| Curing Temp (°F.) | Curing Pressure (psi) | Curing Time | | | | |
|---|---|---|---|---|---|---|
| | | 8 h | 16 h | 24 h | 3 d | 7 d |
| 100 | 800 | 160 psi | 450 | 675 | 1360 | 2020 |
| 125 | 3000 | 400 | 730 | 900 | 1580 | 2070 | sec = seconds
min = minutes
h = hours
d = days

EXAMPLE 2

A petroleum well in Haskell County, Oklahoma, was cemented with an aqueous thixotropic cement slurry containing the concentrate described in Example 1. Lost circulation difficulties had been encountered in petroleum wells in this region due to a highly permeable formation. In this particular cementing job, 100 sacks of an API Class H cement were used to prepare a thixotropic slurry using the concentrate in an amount of 0.8 gallons per sack of cement and a total water content of 64% water, based on the weight of the cement.

During the mixing and pumping operation, the aqueous cement slurry density was purposely varied from 13 to 15.5 pounds per gallon by adding more water at certain points in the operation in an effort to determine the mixing limits of the system. By doing this, the amount of the concentrate also varied from 0.6 to 1.0 gallons per sack of cement. However, most of the cement slurry was held at 14.6 pounds per gallon and 0.8 gallons of concentrate per sack of cement. No viscosity problems were encountered throughout this range and the pumping procedure was very smooth (the pressure on the pump varied from 1400 to 1800 pounds per square inch). The cement slurry exhibited excellent thixotropic behavior even though the appearance of the slurry during mixing in the tub appeared to be thin.

The aqueous cement slurry fulfilled its intended purpose of sealing off thief zones in the formation and filling the annular void space between the walls of the borehole and the casing. No slurry fallback was observed. This field application was very successful.

EXAMPLE 3

In a substantially identical run, except the amounts of $Al_2(SO_4)_3 \cdot 18H_2O$ and $FeSO_4 \cdot 7H_2O$ were changed to 14.3 and 1.7 parts, respectively, the cement slurry gelled within 60 seconds. The gel broke upon agitation (but was extremely viscous) and regelled quickly. Pumping this slurry under field conditions would be more difficult than pumping the slurry from Example 1 due to this increased viscosity.

EXAMPLE 4

In another substantially identical run, except amounts of $Al_2(SO_4)_3 \cdot 18H_2O$ and $FeSO_4 \cdot 7H_2O$ were changed to 3.0 and 13.0 parts, respectively, the cement slurry gelled within 120 seconds, broke easily, and regelled after about 5 minutes. This time to regel was longer than for Example 1 and the gel strength appeared to be somewhat weaker.

COMPARATIVE EXPERIMENTS

In the following experiments, Example 1 was duplicated except that the individual sulfate salts were used instead of the mixture. The individual salts were added in amounts to give the same overall quantity of sulfate anion as found in Example 1.

(A) Aluminum sulfate: A cement slurry was prepared by blending an aqueous solution of aluminum sulfate octadecyl hydrate (16.0 g) dissolved in 300 ml of water with 500 g of an API Class G Portland cement. Components were blended as per Example 1. After mixing, the cement slurry was poured into a container and formed a strong gel within 90 seconds. This gelled cement was extremely stable and would not break by shaking or stirring.

(B) Iron (II) sulfate: The experiment above was repeated using 19.5 g of iron (II) sulfate heptahydrate in place of aluminum sulfate. The cement slurry gelled within 90 seconds after mixing. This gel easily broke into a thin fluid upon agitation. However, the material failed to regel. Such a cement slurry is, therefore, not thixotropic.

These two comparative experiments illustrate the uniqueness and synergistic nature of the combination of aluminum and iron (II) sulfates in cements having calcium hydroxide or hydrolyzable calcium oxide.

What is claimed is:

1. A pumpable, thixotropic hydraulic cement slurry comprising the reaction products obtained from combining (a) iron (II) sulfate, or hydrate thereof, (b) aluminum sulfate, or a hydrate thereof, (c) a hydraulic cement comprising calcium hydroxide or a hydrolyzable calcium oxide and (d) water.

2. The slurry defined by claim 1 wherein said hydraulic cement is a Portland cement.

3. A dimensionally stable cement derived by curing the composition of claim 1 or claim 2.

4. A method for rendering a hydraulic cement thixotropic comprising blending a hydraulic cement comprising a calcium hydroxide or a hydrolyzable calcium oxide, water and an amount, sufficient to render the combination thixotropic, of a liquid, aqueous composition comprising (a) iron (II) sulfate, or a hydrate thereof, (b) aluminum sulfate, or a hydrate thereof, and (c) a stabilizing amount, based on the combined weights of (a) and (b), of sulfuric acid sufficient to maintain (a) and (b) substantially in solution.

5. An improved method of cementing a casing or pipe in a borehole traversing one or more subterranean formations which comprises placing into the annular space between the pipe and the walls of the borehole a pumpable cement slurry as defined by claim 1 or claim 2.

6. A method for sealing a thief zone in a subterranean formation which comprises contacting the opening of said thief zone with the pumpable thixotropic cement slurry defined by claim 1 or claim 2 under conditions of stress or shear such that the thixotropic cement slurry is continuously or intermittently delivered to the opening of the thief zone at a rate such that the thixotropic cement slurry gels or stiffens at the interface of said thief zone; said cement slurry being used in an amount at least sufficient to seal said thief zone.

7. The method defined by claim 4 wherein said hydraulic cement is a Portland cement.

8. A method defined by claim 4 or claim 7 wherein the mole ratio of aluminum in component (b) to iron (II) in component (a) is the range of about 2.5:1 up to about 4:1.

9. The slurry defined by claim 1 or claim 2 wherein the mole ratio of aluminum in component (b) to iron (II) in component (a) ranges from about 2.5:1 to about 4:1.

10. A slurry defined by claim 1 or claim 2 wherein component (a) is iron (II) sulfate heptahydrate and component (b) is aluminum sulfate octadecyl hydrate and the mole ratio of component (b) to component (a) ranges from about 3.2:1 to about 3.8:1.

* * * * *